US005539850A

United States Patent [19]

Henry et al.

[11] Patent Number: 5,539,850
[45] Date of Patent: Jul. 23, 1996

[54] POLARIZATION AND WAVELENGTH INDEPENDENT OPTICAL WAVEGUIDE TAP

[75] Inventors: Charles H. Henry, Skillman; Ronald E. Scotti, White House Station, both of N.J.

[73] Assignee: AT&T Corp., Murray Hill, N.J.

[21] Appl. No.: 366,632

[22] Filed: Dec. 30, 1994

[51] Int. Cl.[6] .................................................. G02B 6/26
[52] U.S. Cl. ........................... 385/48; 385/50; 385/11; 385/16
[58] Field of Search .................... 385/48, 50, 9, 385/39, 40, 41, 42, 43, 45, 27–29, 11, 15–16; 359/161

[56] References Cited

U.S. PATENT DOCUMENTS

| 4,243,295 | 1/1981 | Alferness | 385/9 |
|---|---|---|---|
| 4,772,084 | 9/1988 | Bogert | 385/40 |
| 4,883,335 | 11/1989 | Alferness et al. | 385/48 |
| 4,997,245 | 3/1991 | DuPuy et al. | 385/16 |
| 4,998,793 | 3/1991 | Henry et al. | 385/1 |
| 5,151,957 | 9/1992 | Riviere | 385/41 |
| 5,185,828 | 2/1993 | Van der Tol | 385/28 |
| 5,251,278 | 10/1993 | Samborsky | 385/48 |
| 5,276,746 | 1/1994 | Adar et al. | 385/48 X |
| 5,315,675 | 5/1994 | Dennis et al. | 385/48 X |
| 5,325,221 | 6/1994 | Van der Tol | 385/45 |
| 5,341,444 | 8/1994 | Henry et al. | 385/11 |
| 5,416,864 | 5/1995 | Cassidy et al. | 385/30 |

*Primary Examiner*—Rodney B. Bovernick
*Assistant Examiner*—Hemang Sanghavi

[57] ABSTRACT

An integrated optical device for tapping signal power provides a tap which is substantially independent of wavelength and polarization. The optical device includes a first tap consisting of a first optical waveguide carrying an input signal S disposed in coupling relation with a second optical waveguide for providing an output cross-state transmission $T_1$. The cross-state transmission $T_1$ is polarization and wavelength dependent. The optical device further includes a second tap consisting of a third optical waveguide disposed in coupling relation with and in series with the second optical waveguide carrying the output cross-state transmission $T_1$ for providing an output bar-state transmission $T_2$. The bar-state transmission $T_2$ has an opposite dependency on waveguide coupling than that of the cross-state transmission $T_1$ and, thus, compensates for wavelength and polarization dependencies of the cross-state transmission signal $T_1$, thereby providing an overall tap transmission T which is equal to $T_1 T_2$ and is substantially independent of polarization and wavelength.

13 Claims, 3 Drawing Sheets

POLARIZATION AND WAVELENGTH INDEPENDENT OPTICAL WAVEGUIDE TAP

BACKGROUND OF THE INVENTION

1. Field of the Invention

The present invention relates to integrated optical devices and, more particularly, to an optical device contemplated for tapping signal power from an optical waveguide whereby the tapped signal is substantially independent of polarization and wavelength.

2. Description of the Prior Art

Due to the increase in the use of optical fiber communication channels, the development of integrated optical devices for directly processing optical signals has become of significant importance to system designers. One particularly useful approach for optical processing is through the use of integrated glass waveguide structures formed on silicon substrates. The basic structure of such devices is described in C. H. Henry et al., "Glass Waveguides on Silicon for Hybrid Optical Packaging" 7 *J. Lightwave Technol.*, pp. 1530–1539 (1989). In essence, a silicon substrate is provided with a base layer of $SiO_2$ and a thin core layer of doped silica glass is deposited on the oxide. The core layer can be configured to a desired waveguide structure-typically 5–7 micrometers wide-using standard photolithographic techniques, and a layer of doped silica glass is deposited on the core to act as a top cladding. Depending on the precise configuration of the waveguide, such devices can perform a wide variety of functions including tapping of signal power from the optical waveguide.

In a typical signal tapping application of the aforedescribed integrated optical devices, two waveguides are passed in close adjacency for a length, i.e., coupler length, dependent upon the desired degree of coupling. Energy from one waveguide core is transferred to an adjacent core to effectuate the signal tap.

One shortcoming of such optical tap configurations is that the tapped signal tends to be dependent upon the wavelength of the signal. Another shortcoming concerns the birefringence induced in the waveguide by the strain of the glass layers. The strain is due to the difference in thermal expansion of the glass films composing the waveguide and the substrate. It is compressive when the waveguides are formed on silicon substrates and it's magnitude varies with layer composition. Such strain-induced birefringence presents different indices of refraction for the different polarization modes i.e., the transverse magnetic (TM) mode and the transverse electric (TE) mode of the transmitted light. The effect of this is that the mode confinement is polarization dependent and, consequently, the coupling of two waveguides becomes polarization dependent. Thus, a tapped signal is provided, which is dependent on the polarization state of the signal.

Several techniques have been suggested for overcoming the intrinsic birefringence of glass-on-silicon waveguides. One method employs a half-wave plate inserted in the middle of a waveguide grating multiplexer to rotate the polarization by 90°. See H. Takahashi, et al., "Polarization-Insensitive Arrayed-Waveguide Multiplexer on Silicon" *Opt. Letts.* 17(7), p 499 (1992). This approach, however, leads to excessive loss. Another approach is to deposit on the waveguide a layer (six micrometers) of amorphous silicon. A drawback of this approach is that the silicon layer must be then actively trimmed with a high power laser.

Accordingly, there exists a need for further improvements in compensating for wavelength dependencies and strain-induced birefringence in integrated optical tap devices.

SUMMARY OF THE INVENTION

Generally stated, the present invention is directed to an optical device for tapping signal power wherein the signal tap provided is substantially independent of wavelength and polarization. The preferred optical device comprises first tap means including a first optical waveguide carrying an input signal S disposed in coupling relation with a second optical waveguide for providing an output cross-state transmission $T_1$. The cross-state transmission signal $T_1$ is polarization and wavelength dependent. The optical device further comprises second tap means including a third optical waveguide disposed in coupling relation with and in series with the second optical waveguide carrying the output cross-state transmission $T_1$ for providing an output bar-state transmission signal $T_2$. The bar-state transmission $T_2$ has an opposite dependence on the waveguide coupling than that of the cross-state transmission $T_1$ and, thus, can be chosen to compensate for wavelength and polarization dependencies of the cross-state transmission $T_1$ to provide an overall tap transmission output $T=T_1 T_2$ which is substantially independent of polarization and wavelength.

BRIEF DESCRIPTION OF THE DRAWINGS

The various features and advantages of the invention will be better understood from the following detailed description in conjunction with the accompanying drawings wherein.

DETAILED DESCRIPTION OF THE PREFERRED EMBODIMENT(S)

The following detailed description relates to a technique for tapping optical energy from an optical fiber. This technique is based on the theory that optical energy is transferred from one optical waveguide to an adjacent optical waveguide if the two waveguides are coupled in close proximity for a certain distance or length, i.e., the "coupler length".

Figure 1:
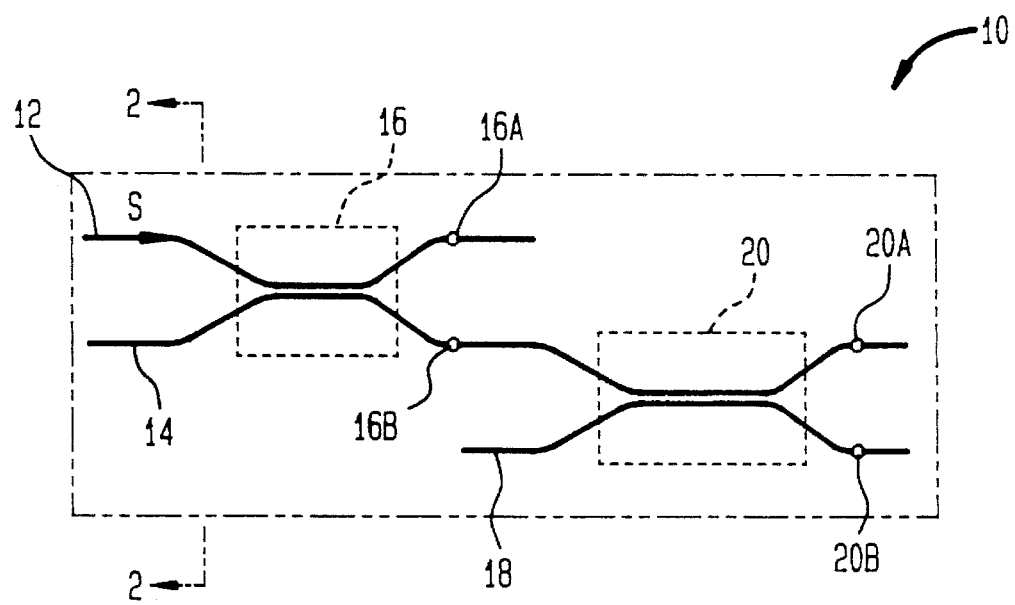
FIG. 1 is a schematic view of an integrated optical circuit including the substantially independent polarization and wavelength optical tap in accordance with the principles of the present invention.

Referring now to FIG. 1, there is illustrated a schematic view of an integrated optical device including the polarization and wavelength independent tap in accordance with the principles of the present invention. The illustrative embodiments of optical tap 10 described in detail hereinbelow are structured to be optically connected to a signal carrying fiber or circuit for the purpose of sampling or monitoring the signal propagating therethrough.

The tap 10 includes three waveguides disposed on a silicon substrate. Waveguide 12, which carries an input signal "S" from an optical signal carrying waveguide, is disposed in coupling relation with waveguide 14 at coupling region 16 for a coupler length "$L_1$" to form a first directional coupler which divides the light on the two waveguides into the two outputs. Similarly, waveguide 14 is disposed in coupling relation with waveguide 18 at coupling region 20 for a coupler length "L" to form a second directional coupler. Waveguides 12, 14 and 18 are preferably identical with regard to geometrical and optical characteristics. Similarly, the core center-to-center separations between the respective waveguides at coupler regions 16, 20 are identical. The respective coupler lengths $L_1$, $L_2$ may vary.

Figure 2:
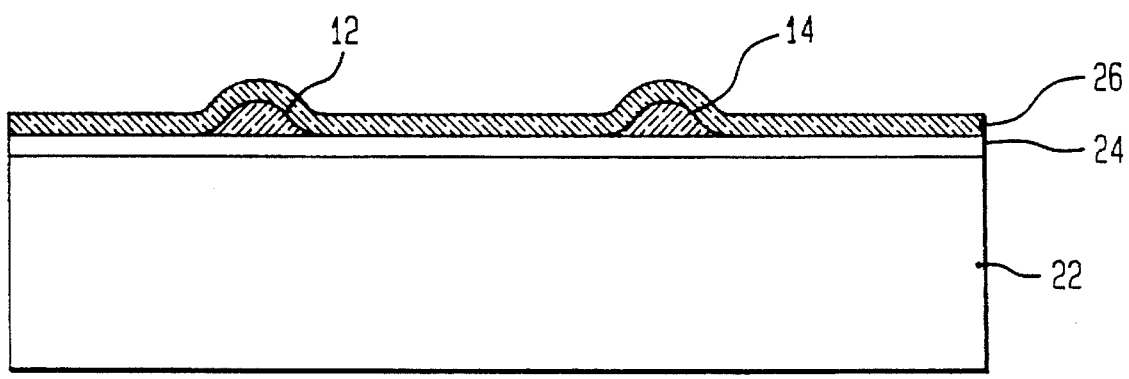
FIG. 2 is a cross-sectional view taken along the lines 2—2 of FIG. 1.

FIG. 2 illustrates the preferred method for fabricating tap 10. FIG. 2 is a cross sectional view taken along the lines 2—2 of FIG. 1. In accordance with the preferred method, waveguide cores 12, 14 and 18 are disposed at their appropriate positions upon a substrate 22 of silicon having an oxide outer layer 24 and then surrounded by a cladding layer 26. The structure shown is advantageously fabricated as described in the aforementioned publication of C. H. Henry et al, "Glass Waveguides on Silicon for Hybrid Optical Packaging", 7 *J. Lightwave Technol.*, pp. 1530–1539 (1989). In essence, silicon substrate 22 is provided with a base layer 24 of $SiO_2$ formed on the silicon or by high pressure steam oxidation or by LPCVD (low pressure chemical vapor deposition). A core layer of 6%–8% phosphorus doped silica having a thickness in the range 4–6 micrometers is deposited on the oxide using LPCVD, and the core layer can be dry etched as by RIE to pattern the waveguides to desired configuration. The core glass is then annealed, and thereafter a 7 micrometer layer of phosphorus and boron doped silica is deposited to act as a top cladding. Typical waveguide core widths are in the range 5–7 micrometers.

Referring again to FIG. 1, the operation of optical tap 10 will be discussed in detail. As a result of the coupling of optical waveguides 12, 14 at coupling region 16, a portion of the signal "S" carried by optical waveguide 12 is coupled onto waveguide 14. The tapped signal identified as $T_1$ represents the cross-state transmission of the coupling and is wavelength and polarization dependent. Consequently, the resulting output signals at locations 16A, 16B are $1-T_1$ and $T_1$, respectively, where 1 is substituted for signal "S" and represents unity.

At coupling region 20, a portion of cross-state transmission signal $T_1$ is tapped onto waveguide 18. The resulting output signals at position 20A, 20B are identified as $T_1T_2$ and $T_1-T_1T_2$, respectively, where $T_2$ is the bar state transmission effectuated by the coupling. Transmission $T_2$ is also wavelength and polarization dependent.

The output signal T defined at position 20A may, under the appropriate conditions, be substantially independent of the polarization and wavelength of the respective transmissions $T_1$ and $T_2$. In particular, the cross-state output $T_1$ and the bar-state output $T_2$ will possess opposite dependencies on waveguide coupling. Consequently, a cancellation of these dependencies will occur, provided transmission $T_2$ is of the appropriate compensating magnitude, since the overall output transmission T at location 20A is the product of the cross state of coupler region 16, i.e., $T_1$, and the bar-state of coupler region 20, i.e., $T_2$.

It is possible to theoretically determine the value of transmission $T_2$ which is required to compensate for the polarization and wavelength dependencies of transmission $T_1$ so as to generate the substantially polarization and wavelength independent tap transmission T at the output. In this regard, it is to be appreciated that tapped signals $T_1$, $T_2$ are directly related to a coupling parameter (hereafter referred to as parameter $\delta$) which is a function of the optical characteristics of the waveguide materials, center to center spacing dimensions of the coupled waveguides, etc... For each coupler, the cross-state transmission equals $\sin^2(\delta L)$ and the bar state transmission equals $\cos^2(\delta L)$, where L is the coupler length. Parameter $\delta$ is inversely related to the coupling length which is the length for which the power would completely transfer between waveguides.

As stated above, the power transmission of tapped signal T at location 20A is represented by the equation $T=T_1T_2$. We will find the relation between $T_1$ and $T_2$ such that the derivative $$\frac{dT}{d\delta} = 0.$$

T depends on wavelength and polarization through the dependence of $\delta$ on strain birefringence and wavelength. Thus, setting $$\frac{dT}{d\delta} = 0$$

also sets to zero the first order (linear) dependence of T both on wavelength and strain birefringence. Differentiating ln (T)=ln ($T_1T_2$), where ln is the natural logarithm, we find:

$$\frac{1}{T} \frac{dT}{d\delta} = \frac{1}{T_1} \frac{dT_1}{d\delta} + \frac{1}{T_2} \frac{dT_2}{d\delta} \qquad (1)$$

Thus, by setting $$\frac{1}{T} \frac{dT}{d\delta} = 0,$$

we can theoretically find the values of tapped transmissions $T_1$ and $T_2$ such that T is insensitive to a change in $\delta$, i.e., for a given value $T_1$, a value of $T_2$ can be identified which compensates the wavelength and polarization dependencies of $T_1$ and produces a tap output transmission T substantially independent of polarization and wavelength.

The amplitudes of the waveforms of $T_1$ and $T_2$ are a function of $\delta$ and the respective coupler lengths $L_1$, $L_2$ at coupling regions 16, 20. As stated above, coupler lengths $L_1$ and $L_2$ are defined as the effective lengths associated with coupling including the ends of the couplers where the waveguides are bending away from each other. The transmission $T_1$ is represented by $\sin^2(\delta L_1)$ and the transmission $T_2$ is represented by $\cos^2(\delta L_2)$ where $L_1$ is the coupler length of coupling region 16 and $L_2$ is the coupler length of coupling region 20. Thus, $$T_1 = \sin^2(\delta L_1) \qquad (2)$$

and $$T_2 = \cos^2(\delta L_2) \qquad (3)$$

The derivative of equation (2) is $$\frac{1}{T_1} \frac{dT_1}{d\delta} = 2L_1 \frac{\cos(\delta L_1)}{\sin(\delta L_1)} \qquad (4)$$

and the derivative of equation (3) is $$\frac{1}{T_2}\frac{dT_2}{d\delta} = -2L_2\frac{\sin(\delta L_2)}{\cos(\delta L_2)} \quad (5)$$

By substituting equations (4) and (5) into equation (1), equation (1) becomes $$\left(2L_1\frac{\cos(\delta L_1)}{\sin(\delta L_1)}\right) + \left(-2L_2\frac{\sin(\delta L_2)}{\cos(\delta L_2)}\right) = 0 \quad (6)$$

Multiplying this equation by $\delta$ and dividing by 2, we find $$\delta L_2\frac{\sin(\delta L_2)}{\cos(\delta L_2)} = \delta L_1\frac{\cos(\delta L_1)}{\sin(\delta L_1)} \quad (7)$$

By reference to equation (7), it is to be noted that for a relatively small value of $T_1$, $\delta L_1$ is nearly zero, $\cos(\delta L_1)$ is approximately 1 and $\sin(\delta L_1)$ is equal to $\delta L_1$. Thus, for a small value of $T_1$, equation (7) becomes:

$$\delta L_2\frac{\sin(\delta L_2)}{\cos(\delta L_2)} \simeq 1 \quad (8)$$

Therefore, for a relatively small value of $\delta L_1$, $\delta L_2$ and $T_2$ are each constant. Consequently, there exists a universal value of $T_2$ which represents the compensating tap loss required to compensate the polarization and wavelength dependencies of $T_1$ so as to produce a tapped signal T which is substantially polarization and wavelength independent, providing $T_1$ is small compared to unity.

Equations (2) and (3) can be used to rewrite equation (7) in terms of $T_1$ and $T_2$. The resulting equation is:

$$\arccos(\sqrt{T_2})\frac{\sqrt{1-T_2}}{\sqrt{T_2}} = \frac{\sqrt{1-T_1}}{\sqrt{T_1}}\arcsin(\sqrt{T_1}) \quad (9)$$

Figure 3:
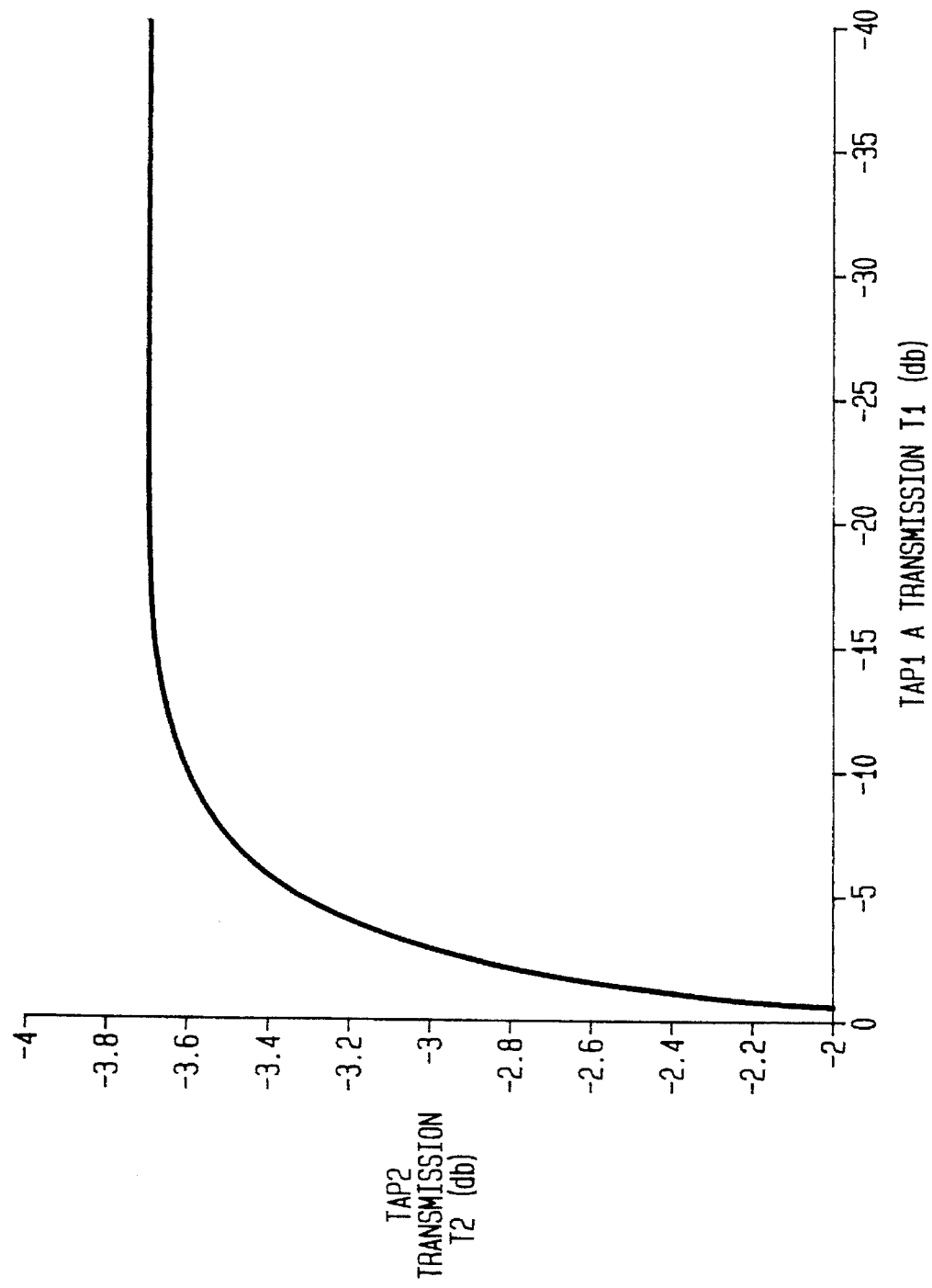
FIG. 3 is a graphical representation illustrating the theoretical calculated values of each of the tapped transmissions $T_1$, $T_2$ generated by the two regions of the optical tap of FIG. 1 to produce an output transmission T which is substantially polarization and wavelength independent.

Equation 9 can be solved numerically to identify the theoretical compensating values of signal tap $T_2$ required for given values of output signal $T_1$. The graph of FIG. 3 illustrates the theoretical values of $T_2$ required to compensate for polarization and wavelength dependencies of $T_1$. As depicted in the graph and by way of example, for a value of $T_1$, the required value of bar state transmission $T_2$ needed to compensate for the polarization and wavelength dependencies of $T_1$ is between −3 db and −3.71 db. At values of $T_1$ from about −17 db to −40 db, $T_2$ reaches its asymptotic or universal value of −3.71 db. Thus, an additional attenuation of at most −3.71 db is required for cancellation of the polarization and wavelength dependencies of tapped signal $T_1$. This is a relatively small price to pay to provide a tapped signal T independent of wavelength and polarization.

Figure 4:
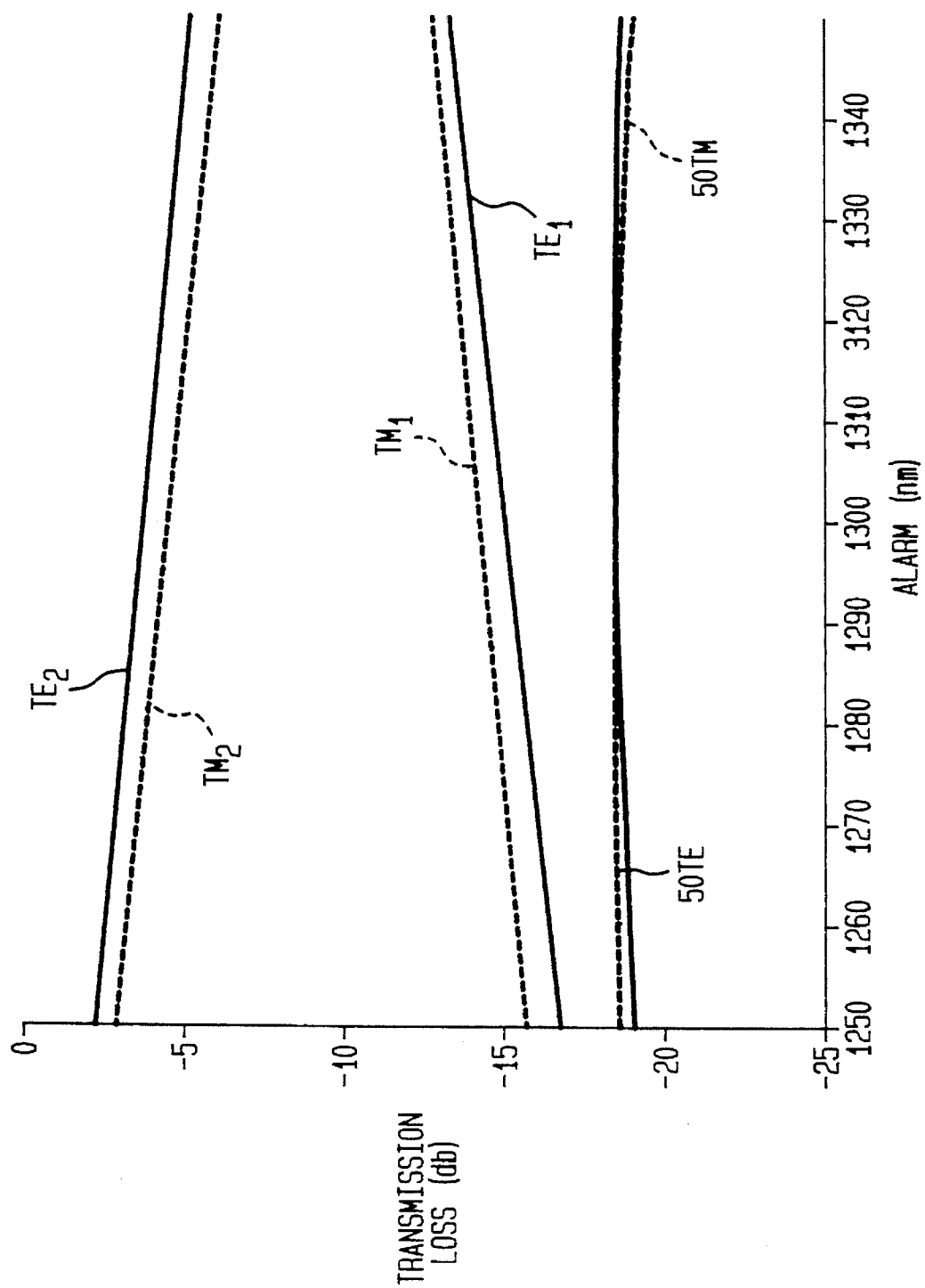
FIG. 4 is a spectra of tapped transmissions $T_1$, $T_2$ and an overall output T (where $T=T_1 T_2$) of an illustrative computer-simulated embodiment of the optical tap of FIG. 1.

Referring now to FIG. 4, in conjunction with FIG. 1, an illustrative embodiment of the optical tap 10 of the present invention is depicted. The curves in FIG. 4 are spectra of the individual transmissions $T_1$, $T_2$ and the output transmission T of a computer simulated embodiment of the device of FIG. 1. In accordance with the simulated embodiment, signal carrying waveguide 12 is coupled with waveguide 14 at coupling region 16 for a length $L_1$ of about 173 microns so as to form a −15 db directional coupler at a wavelength of 1300 nm for TE polarization. Waveguides 14, 18 are coupled for a predetermined length $L_2$ of about 1850 microns at coupler region 20 to form a −2.4 db directional coupler which provides a bar state transmission of about −3.7 db within coupler 20 at a wavelength of 1300 nm for TE polarization. In this embodiment, lengths $L_l$ and $L_2$ are each defined as the distances for which the respective waveguides 12, 14, 18 are in parallel coupling relation in their respective coupling regions 16, 20. Additional parameters of this illustrative embodiment include a waveguide core width of about 5.0 microns and a core center-to-center separation of about 9.5 microns.

As illustrated in FIG. 4, the individual output transmissions $T_1$, $T_2$ are both polarization and wavelength dependent. In particular, the transverse electric (TE) (which is the electric field parallel to the substrate) polarization and the transverse magnetic (TM) (which is the electric field perpendicular to the substrate) polarization have different transmission losses for its respective transmission $T_1$, $T_2$. Similarly, the transmission losses also vary with the wavelength of its respective transmissions $T_1$, $T_2$. In the graph, the TE polarization and TM polarization for transmission $T_1$ are illustrated as solid line $TE_1$ and dashed line region $TM_1$, respectively. The TE polarizations and TM polarization for transmission $T_2$ are illustrated as solid line $TE_2$ and dashed line $TM_2$, respectively.

Referring still to FIG. 4, the resulting output transmission T effectuated by transmission $T_1$ and compensating transmission $T_2$ is substantially polarization and wavelength independent. The TE polarization and TM polarization for tap 10 are illustrated as solid line 50TE and dashed line 50TM, respectively. As shown, the TE and TM polarizations are substantially identical and remain constant having a total transmission loss of approximately—19 db throughout a wavelength of 1250– 1350 nm. Thus, in this example, to accomplish the compensation of tapped transmission $T_1$ so as to produce a substantially polarization and wavelength independent transmission T would entail approximately a minus 3.6–3.7 db additional attenuation as provided through bar state transmission $T_2$. This is relatively minimal attenuation required to achieve wavelength and polarization independence.

It is to be noted that in accordance with the principles of the present invention, compensation for polarization and wavelength dependencies may be achieved if couplers 16, 20 differ in cross sections and possess different values of coupling parameter $\delta$.

The present invention also has application in other waveguide technologies where the operation of the tap can be described by a coupling parameter $\delta$ that controls the wavelength and polarization dependencies, i.e., where the cross and bar state transmissions are $\sin^2(\delta L)$ and $\cos^2(\delta L)$, respectively. For example, the principles of the present invention can have application with semiconductor waveguide integrated optical circuits having Group III–V semiconductor waveguide materials.

Further, the arrangement of optical tap 10 may also be used in tapping signals from a conventional non-integrated optical fiber network, so as to produce a tapped signal transmission which is substantially independent of wavelength.

It is to be understood that the above-described embodiment is illustrative of only one of the many possible specific embodiments which can represent applications of the principles of the invention. Numerous and varied other arrangements can be made by those skilled in the art without departing from the spirit and scope of the invention.

What is claimed is:

1. A passive optical device for tapping signal power, which comprises:

first tap means for passively tapping signal power from an optical waveguide, said first tap means including a first optical waveguide carrying an input signal S disposed in coupling relation with a second optical waveguide for providing an output cross-state transmission $T_1$; and second tap means for passively tapping signal power from said second optical waveguide, said second tap means including a third optical waveguide disposed in coupling relation with said second optical waveguide carrying said output cross-state transmission $T_1$ for providing an output bar-state transmission $T_2$, said bar-state transmission $T_2$ compensating for wavelength and polarization dependencies of said cross-state transmission $T_1$ such that an output signal T-provided by said first and second tap means is substantially independent of polarization and wavelength.

2. The optical device according to claim 1 wherein said output cross-state transmission $T_1$ and said output bar-state transmission $T_2$ have opposite dependencies on a coupling parameter.

3. The optical device according to claim 2 wherein said output transmission T is defined as the product of said output cross-state transmission $T_1$ and said output bar-state transmission $T_2$.

4. The optical device according to claim 3 wherein said waveguides comprise doped silica overlying a silicon substrate.

5. The optical device according to claim 4 wherein said cross-state transmission $T_1$ has a value ranging from about −3.0 db to about −50.0 db and wherein said bar-state transmission $T_2$ ranges from about −3.0 db to about −4.5 db.

6. An integrated passive optical device for tapping signal power from a signal carrying waveguide, which comprises:

a first optical waveguide for carrying an input signal S;

a second optical waveguide passively coupled with said first optical waveguide carrying said input signal S for forming a first tap with an output cross-state transmission signal $T_1$; and a third optical waveguide passively coupled with said second optical waveguide carrying said output cross-state transmission signal $T_1$ for forming a second tap with an output bar-state transmission signal $T_2$;

wherein a resulting output transmission T of said second optical waveguide is defined as the product of said cross-state transmission $T_1$ and said bar-state transmission $T_2$ and is substantially independent of polarization and wavelength of said transmissions $T_1$ and $T_2$.

7. The integrated optical device according to claim 6 wherein said first, second and third optical waveguides comprise doped silica overlying a silicon substrate.

8. The integrated optical device according to claim 6 wherein said first, second and third waveguides possess substantially the same widths.

9. The integrated optical device according to claim 8 wherein said first and second waveguides are spaced a first predetermined distance when in a coupled state and wherein said second and third waveguides are spaced a second predetermined distance when in a coupled state and wherein said first and second predetermined distances are substantially equivalent.

10. The integrated optical device according to claim 6 further comprising a substrate and a cladding layer disposed on said substrate, said cladding layer being disposed about said optical waveguides.

11. The integrated optical device according to claim 10 wherein said substrate comprises silicon, said cladding layer comprises silica or doped silica and said waveguides comprise doped silica glass.

12. The integrated optical device according to claim 11 wherein said cross-state transmission $T_1$ has a value ranging from about −3.0 db to about −50.0 db and wherein said bar-state transmission $T_2$ has a value ranging from about −3.0 db to about −4.5 db.

13. A method for passively tapping signal power from a signal carrying waveguide to provide a tapped signal which is substantially independent of polarization and wavelength, the method comprising the steps of:

passively coupling a first optical waveguide with a signal carrying waveguide carrying an input signal S to a second optical waveguide to produce a first tap with an output cross-state transmission $T_1$; and passively coupling said second optical waveguide carrying said cross-state transmission $T_1$ with a third optical waveguide to produce a second tap having an output bar-state transmission $T_2$, said output bar-state transmission $T_2$ compensating for wavelength and polarization dependencies of said cross-state transmission $T_1$ such that an output signal T of the second optical waveguide effectuated by coupling of said first and second optical waveguides and said second and third optical waveguides is substantially independent of polarization and wavelength.

* * * * *